United States Patent [19]

Yamazaki et al.

[11] 4,389,519
[45] Jun. 21, 1983

[54] COMPOSITION FOR POLYURETHANE ADHESIVES

[75] Inventors: Kyuya Yamazaki, Ibaraki; Sachio Igarashi, Suita; Koichi Shibata, Ashiya, all of Japan

[73] Assignee: Takeda Chemical Industries, Ltd., Osaka, Japan

[21] Appl. No.: 321,926

[22] Filed: Nov. 16, 1981

[30] Foreign Application Priority Data

Nov. 28, 1980 [JP] Japan .................. 55-168374

[51] Int. Cl.³ .................. C08G 18/75; C08G 18/79
[52] U.S. Cl. .................. 528/73; 260/453 A; 260/453 AR; 260/453 PH; 528/44; 528/75
[58] Field of Search .................. 528/44, 75, 73; 260/453 AR, 453 A

[56] References Cited

U.S. PATENT DOCUMENTS

| | | | |
|---|---|---|---|
| 3,294,753 | 12/1966 | Beitchman et al. | 260/77.5 |
| 3,490,987 | 1/1970 | Bauriedel | 161/190 |
| 3,645,979 | 2/1972 | Liebsch et al. | 260/77.5 NC |
| 3,755,242 | 8/1973 | Reich | 528/44 |
| 4,113,705 | 9/1978 | Beck et al. | 528/44 |
| 4,184,031 | 1/1980 | Graham et al. | 528/55 |
| 4,338,256 | 7/1982 | Fujinami et al. | 528/44 |

OTHER PUBLICATIONS

Doyle-Development & Use of Polyurethane Products, McGraw-Hill, N.Y., pp. 6 and 7.

*Primary Examiner*—H. S. Cockeram
*Attorney, Agent, or Firm*—Wenderoth, Lind & Ponack

[57] ABSTRACT

A composition for polyurethane adhesives comprising (1) a triisocyanate of the formula:

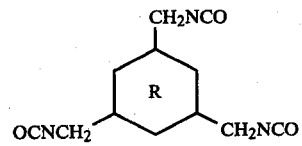

wherein

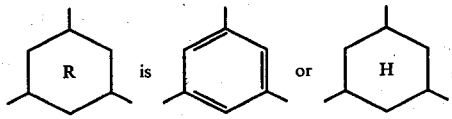

a modified product of said triisocyanate or an adduct of said triisocyanate having terminal isocyanate groups and (2) an active hydrogen compound exhibits excellent adhesion, especially between polyethylene terephthalates, polyolefins and metals, heat resistance and weatherability, and has low toxicity and can be solventless or light solid.

8 Claims, No Drawings

COMPOSITION FOR POLYURETHANE ADHESIVES

The present invention relates to compositions for polyurethane adhesives, and more particularly to compositions for polyurethane adhesives which are solventless or highsolids and exhibit excellent adhesion, heat resistance and weatherability, and have low toxicity.

Heretofore, polyurethane adhesives comprising an isocyanate component and an active hydrogen component are well known in the art.

As isocyanate components which serve as raw material for polyurethanes, use has been made of aromatic isocyanates such as tolylene diisocyanate (TDI) and diphenylmethane diisocyanate (MDI). However, polyurethane resins based on these aromatic isocyanates have the serious defect of yellowing or undergoing considerable deterioration in bond strength on exposure to sunlight or by heating at elevated temperature, and, when used as adhesives or pressure sensitive adhesives, for example, cause white printed bonded films to yellow, leading to marked deterioration in their merchandise value. Thus, such defect has become the great restriction on their commercial applications.

On the other hand, also well known are adhesives, pressure sensitive adhesives and the like based on aliphatic isocyanate compounds such as hexamethylene diisocyanate (HDI), xylylene diisocyanate (XDI), hydrogenated xylylene diisocyanate (H₆XDI) and isophorone diisocyanate (IPDI). Nevertheless, even these diisocyanates, because of their small number of functional groups per molecule and high vapor pressure at ambient temperature, raise the problem of safety and hygiene to workers, and therefore used as adducts with polyhydric alcohols or as modified products among themselves. However, such adducts and the like exhibit, as a whole, a lowered isocyanato-group content and increased viscosity, and consequently, it is normal in their industrial application to employ large amounts of solvents so as to produce resin solutions with improved workability. Employment of such large amounts of solvents not only requires massive energy and equipment but also, coupled with recently tightened environmental pollution control, costs a great deal for recovery of evaporated solvents and treatment of waste gases. This develops the defect of increased costs of the goods produced by use of the adhesives as described above. In producing adducts which are converted into the abovementioned adhesives, furthermore, the complex production steps and costly production facilities are required in order to reduce an isocyanate monomer content as far as possible, and the fact eventually results in an increase in costs for the production of adhesives. Since it is industrially impossible to reduce a monomer content of adhesives to zero, further, the adhesives thus obtained have an irritating odor resulting therefrom, and possible health hazards which workers suffer from become an important problem from a social point of view.

The present inventors, with a specific aim to elimination of all of various defects of currently employed raw materials and production of polyurethane adhesives which exhibit excellent adhesion, heat resistance and weatherability and are solvent-free or high-solid ones requiring a small amount of solvent, conducted intensive research, and as a result, have completed the present invention.

Thus, the present invention relates to compositions for adhesives which contain, as an isocyanate component, a triisocyanate of the general formula [I]:

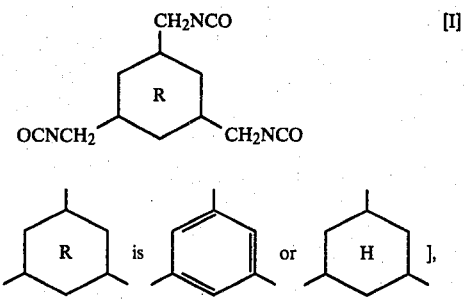

a modified product of said triisocyanate or an adduct of said triisocyanate having terminal triisocyanate groups and, as an active hydrogen component, an active hydrogen compound.

Specific examples of the triisocyanates used in the present invention which may be represented by the abovementioned general formula [I] include 1,3,5-tris-(isocyanatomethyl)benzene (MTI) and 1,3,5-tris-(isocyanatomethyl)cyclohexane (H₆MTI). These are novel compounds which can be produced by phosgenating 1,3,5-tris(aminomethyl)benzene or 1,3,5-tris-(aminomethyl)cyclohexane by conventional procedures. For instance, these can be produced by the procedures of Reference Examples 1 to 6 as described below.

In the present invention, the triisocyanates can be used as such or in the form of their modified products such as their dimers, trimers and carbodiimides, and their adducts having isocyanate groups at their terminals produced by their reaction with an active hydrogen compound having at least two active hydrogens in its molecule can also be utilized. As the active hydrogen compound, there may be mentioned polyols, polyamides, aminoalcohols, water, etc. Among the active hydrogen compounds, polyol having molecular weight of 62 to 200 are particularly preferable and examples of these include glycols and triols such as ethylene glycol, propylene glycol, butylene glycol, hyxylene glycol, neopentyl glycol, cyclohexanedimethanol, glycerol, trimethylolpropane, pentaerythritol, diethylene glycol and dipropylene glycol. In general, the triisocyanate is reacted with the polyol at an NCO/OH ratio of about 1.5 to 7 to produce such adduct.

As the active hydrogen compound which can be used in combination with the triisocyanates, their modified product or their adducts, there may be mentioned compounds containing at least two active hydrogens in its molecule and having molecular weight of 62 to 50,000, preferably 500 to 20,000. Among such compounds, suitable are polyhydroxyl compounds, and use is made of polyhydroxyl compounds having 2 to 10 hydroxyl groups per one molecule and 500 to 20,000 in molecular weight, and preferably polyols having 2 to 6 hydroxyl groups per one molecule and 500 to 10,000 in molecular weight. In addition to the compounds having hydroxyl groups, such active hydrogen compounds may include compounds which contain the functional groups having active hydrogen such as carboxyl, amino and thiol groups. In more particular, use can be suitably made of polyester polyols, polyether polyols, polyether ester polyols, polyester amides, acrylic polyols, polyurethane polyols or their mixtures.

As examples of such polyester polyols, there may be mentioned reaction products of polyhydric alcohols with polybasic acids. Examples of such polyhydric alcohols include ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol and sorbitol. As examples of such polybasic acids, there can be mentioned succinic acid, adipic acid, azelaic acid, sebacic acid, phthalic acid, isophthalic acid, terephthalic acid, tetrahydrophthalic acid, hexahydrophthalic acid, maleic acid, fumaric acid and their acid anhydrides. Also, polyester polyols obtained by the ring-opening polymerization of lactones such as caprolactone and methylcarpolactone are suitable examples.

As examples of such polyether polyols, there may be mentioned those which can be produced by polymerizing epoxide compounds, such as ethylene oxide, propylene oxide, butylene oxide, tetrahydrofurane, styrene oxide, epichlorohydrin, phenylglycidyl ether and arylglycidyl ether, in the presence of catalyst such as boron trifluoride or by allowing these epoxide compounds, alone or in mixture, to add randomly or alternately to initiators containing reactive hydrogen atoms. Examples of the initiators containing reactive hydrogen atoms include polyols such as water, ethylene glycol, propylene glycol, glycerol, trimethylolpropane, pentaerythritol and sorbitol, aminoalcohols such as ethanolamine, and polyamines such as ethylenediamine.

As examples of such polyether ester polyol, there can be mentioned compounds having both polyether and polyester segments in one molecule as obtained by the ring-opening copolymerization reaction of epoxide compounds with acids, in addition to those obtained by subjecting the abovementioned polyethers as raw material and polybasic acids to polyesterification reaction.

As examples of such polyester amides, there may be mentioned those which can be produced by utilizing in the above-mentioned polyesterification reaction raw materials having amino groups such as ethylenediamine, propylenediamine, hexamethylenediamine, xylylenediamine, hydrogenated xylylenediamine, ethanolamine and propanolamine.

Hydroxyl-group containing polymers as referred to generally as acrylic polyols can be synthesized by copolymerizing polymerizable monomers containing not less than one hydroxyl group in one molecule with other monomers copolymerizable therewith. As examples of such hydroxyl-group containing monomers, there may be mentioned hydroxyethyl acrylate, hydroxypropyl acrylate, hydroxybutyl acrylate and trimethylolpropane monoacrylate, and methacrylic acid derivatives corresponding to them, while examples of such copolymerizable monomers include acrylic acid and its methyl, ethyl, propyl, butyl and 2-ethylhexyl esters, methacrylic acid and its esters corresponding to the above, styrene, α-methylstyrene, vinyl acetate, acrylonitrile, methacrylonitrile, etc. As the polyols which serve the same purpose, furthermore, use can be made of partially saponified products of vinyl acetate homopolymers and its copolymers with other copolymerizable monomers inclusive of ethylene.

Said polyurethane polyols are polyols having urethane linkages in one molecule, which are obtained for example by reacting a diol compound of a suitable molecular weight, such as polyester glycols, polyether glycols and polyester ether glycols of about 500 to 3000 in molecular weight, with a diisocyanate at a nearly equimolar ratio of hydroxyl-group/isocyanate-group to produce a compound having terminal NCO groups, followed by reacting such compound with an excessive amount of a low molecular weight polyol, such as ethylene glycol, propylene glycol, butylene glycol, hexylene glycol, neopentyl glycol, cyclohexanedimethanol, diethylene glycol and dipropylene glycol. Among such polyurethane polyols, the products obtained by reacting the above-mentioned polyol compound having relatively low molecular weight with a triisocyanate or/and known polyisocyanate compound at an excessive molar ratio of hydroxylgroup/isocyanate-group are the polyurethane polyols which are suitably used as low-viscosity and high-solid type adhesive compositions.

In addition to the above, the polyols which can be used in the present invention include oil-modified polyols, castor oil, epoxy-containing polyols, polybutadiene polyols, etc.

Besides the hydroxyl-containing compounds having relatively high molecular weight as described previously, furthermore, low molecular weight polyols having molecular weight in the range of about 62 to 400 can be used alone or as mixtures so as to attain more desirable performance. Examples of such low molecular weight polyols include ethylene glycol, propylene glycol, butylene glycol, hexylene glycol, neopentyl glycol, cyclohexanedimethanol, glycerol, trimethylolpropane, pentaerythritol, diethylene glycol, dipropylene glycol, etc.

The adhesive compositions according to the present invention comprise a triisocyanate of the general formula [I] or its modified product or an adduct of said triisocyanate having isocyanate groups at its terminals and an active hydrogen compound, and can be utilized as one-component or two-components adhesives, depending upon the purpose.

Thus, the one-component adhesive which comprises a triisocyanate or its modified product reacted in advance with an active hydrogen compound in the excessive isocyanate-group conditions cures for bonding by the reaction with water or air humidity. In the production of one-component adhesives, the reaction of an isocyanate with an active hydrogen compound, for example in the case of the latter being a polyol, may be conducted at the NCO/OH equivalent ratio of not less than 1.5, normally 1.5 to 20 and preferably 2 to 10. When the NCO/OH ratio is less than 1.5, the resulting composition shows poor storage stability and gels in some instances depending upon the storing conditions. If the NCO/OH ratio is in excess of 20, the resulting composition exhibits bad curing characteristics and cannot provide adequate bonding strength. The reaction temperature is normally 30° C. to 100° C., and the reaction can be conducted in the presence or absence of solvent inert to isocyanate group, whereby it is favorable in some instances to carry out the reaction in the presence of solvent. Examples of such solvent include ethyl acetate, butyl acetate, methyl ethyl ketone, methyl isobutyl ketone, acetone, toluene, xylene, tetrahydrofuran, dioxane, ethoxyethyl acetate, dimethylacetamide, etc. The present reaction may be conducted by the addition of organic metal and tertiary amine catalysts, if desired.

Another mode of the present invention represents the two-components adhesive composition that is used by mixing a triisocyanate or its adduct having terminal isocyanate groups with an active hydrogen compound just before its use. In such case, the formulation ratio at which mixing is carried out at the NCO/OH ratio within the range of 0.4 to 20, preferably 1 to 10, for example in the case of a polyol, produce such composition. For the two-components adhesive, use can be made of the same organic solvents or catalysts as used for the one-component adhesive.

Generally, the two-components often has wider application fields and better bonding performance than the one-component, but the present invention is not limited to the two-components.

In order to enhance further the performance as adhesive of the composition thus obtained, if necessary, use can be made of additives commonly used in the art, inclusive of antioxidants, ultraviolet absorbers, hydrolysis stabilizers, antimolds, thickening agents, plasticizers, pigments and fillers. Also, known catalysts, additives, etc. can be used for the regulation of the curing reaction.

The composition for adhesives according to the present invention, even if its non-volatile content (NV) is 50 to 100 wt.%, displays the viscosity in the range of 10 to 10,000 centipoise and possesses satisfactory characteristics as the so-called solvent-free or high-solid adhesive, thus permitting application of conventional bonding-processing methods. For example, the adhesive composition is allowed to adhere on the surfaces to be bonded by use of a solventless adhesive laminator or dry laminator or by means of other spreading methods or immersion method, and the surfaces to be bonded are put together, directly in the case of a solvent-free adhesive or after evaporating the solvent in the case of a solvent-base adhesive, followed by performing curing under pressure with heating or at ambient temperature. Conventionally available compositions for urethane adhesives, containing 50 to 95 wt.% of solvent at the time of use, require massive energy and solvent recovery facilities for evaporation of such solvent, whereas, on the contrary, it is feasible with the composition of the present invention to reduce the costs and expenses for such purposes down to not more than the half of those required conventionally.

The polyurethane adhesive composition of the present invention exhibits strong adhesion between polyesters such as polyethylene terephthalate, polyolefins such as polyethylene, polypropylene and metals such as aluminum. When polyethylene terephthalate, aluminum and polypropylene are bonded to three-ply pouches as packaging and wrapping material for food, and the pouches after wrapping food are sterilized at 135° C. under tightly sealed conditions, for example, the conventional urethane adhesives give rise to defects such as yellowing, lowered bonding strength, reduced physical strength as packaging and wrapping material and considerably deteriorated merchandise value, whereas the adhesive composition according to the present invention does not show any of such defects as described above and possesses highly desirable properties of retaining good conditions over a prolonged period of time. Also, the adhesive composition displays adequate adhesion to various kinds of synthetic and natural high molecular weight substances and various metals other than the above-mentioned ones, as well. Further, the composition of the present invention can be utilized as a pressure sensitive adhesive.

Moreover, the adhesive composition of the present invention has very low toxicity and, therefore, is very suitable for bonding of wrapping material for food.

Given below are the reference examples and examples to illustrate more specifically the present invention.

Reference Example 1

Production of 1,3,5-tricyanobenzene

To 150 parts of 33% aqueous solution of oxalic acid was added 18.2 parts of vanadium pentaoxide, and the mixture was heated on a hot water bath at about 100° C. to dissolve vanadium pentaoxide. The resultant solution was designated "A-solution". By the same procedure, 20 parts of chromium oxide (VI) was dissolved in 150 parts of 33% aqueous solution of oxalic acid, and the resultant solution was designated "B-solution". Both of the A and B solutions were mixed uniformly.

300 parts of anatase-type titanium dioxide powder calcined at 300° C. was added to the mixed solution, and water was evaporated from the mixture under stirring. The resultant slurry was molded by wet extrusion to a cylindrical form of 4 mm-diameter and 5 mm-length. The moldings obtained were dried at 100° C. for 15 hours and then calcined in the air at 500° C. for 4 hours.

About 200 ml of the catalyst thus obtained was filled in a conventional fixed-bed reactor, and a mixed gas composed of 0.5 mole % of mesitylene, 7 mole % of ammonia and 92.5 mole % of air was reacted at atmospheric pressure at a space velocity of 1000 hr$^{-1}$ (converted as NTP), thereby affording 1,3,5-tricyanobenzene in 51.2 mole % yield.

Reference Example 2

Production of 1,3,5-tris(aminomethyl)benzene

In a 300-ml capacity autoclave equipped with a magnetic stirrer was sealed 15 g of 1,3,5-tricyanobenzene (MTN), together with 15 g of Raney nickel.chromium catalyst (atomic ratio of Ni:Cr=49:1), 27 ml of methanol, 63 ml of xylene and 0.18 g of caustic soda. Hydrogen gas was fed into it at initial pressure of 100 kg/cm$^2$G, and the reaction was carried out at 100° C., whereby 0.59 mole of hydrogen was absorbed for 35 minutes. The catalyst was filtered out, and the solvent was evaporated, followed by concentration under reduced pressure. By the above procedure, there was obtained 12.8 g of colorless crystals of 1,3,5-tris-(aminomethyl)benzene (MTA). The substance showed melting point of 49° to 51° C. and boiling point of 136° to 139° C./0.4 mmHg.

Reference Example 3

Production of 1,3,5-tris(aminomethyl)cyclohexane

In a 300-ml capacity autoclave equipped with a magnetic stirrer was sealed 30 g of 1,3,5-tris(aminomethyl)-benzene (MTA) as obtained in Reference Example 2, together with 3 g of 5% ruthenium-alumina catalyst (produced by Nippon Engelhard Ltd.), 60 g of water, and 0.75 g of caustic soda, and hydrogen gas was fed into it at initial pressure of 120 kg/cm$^2$G. The reaction was allowed to proceed at 115° C. for 25 minutes, whereby 0.61 mole of hydrogen was absorbed.

The catalyst was filtered out, and the solvent was evaporated, followed by concentration under reduced pressure. By the above procedure, there was obtained 26.8 g of 1,3,5-tris(aminomethyl)cyclohexane (H$_6$MTA). The H$_6$MTA was a colorless, clear low-viscosity liquid having boiling point of 127° to 128° C./1 mmHg.

Reference Example 4

Production of 1,3,5-tris(aminomethyl)cyclohexane

In a 300-ml capacity autoclave equipped with a magnetic stirrer was sealed 20 g of 1,3,5-tricyanobenzene as obtained in Reference Example 1, together with 80 ml of 25% aqueous ammonia, 300 mg of caustic soda and 4 g of 5% rhodium-alumina catalyst commercially available and the reaction was allowed to proceed at 105° C. for 70 minutes in the presence of high-pressure hydrogen at initial pressure of 120 kg/cm$^2$G, whereby 0.95 mole of hydrogen was absorbed. By the above procedure, there was obtained H$_6$MTA having both nitrile and nucleus hydrogenated in 45% yield.

Reference Example 5

Production of 1,3,5-tris(isocyanatomethyl)benzene

A 90.0 g of 1,3,5-tris(aminomethyl)benzene was dissolved by heating in 1200 ml of o-dichlorobenzene in a 2 1 four-necked flask. Carbon dioxide gas was introduced into the amine solution thus obtained until no increase in weight was observed, thereby yielding slurry of colorless crystals. The slurry was maintained at not higher than 10° C. for 30 minutes, while feeding phosgene into the flask under stirring, and then was heated to 130° C. over a 2-hour period while continuing phosgene feed, followed by maintaining at 130° C. for 5 hours. As the phosgenation reaction proceeded, the slurry turned into a solution, which ultimately became a uniform, slightly yellowish, clear solution.

The solution obtained by the conclusion of the phosgenation reaction was freed of the dissolved phosgene by blowing a nitrogen gas into it, and then the solvent of o-dichlorobenzene was distilled off under reduced pressure. Vacuum distillation of the resultant crude isocyanate afforded 112.9 g of 1,3,5-tris(isocyanatomethyl)benzene (MTI) of 173° to 175° C./0.4 mmHg in boiling point (in mole yield of 85.21%). The MTI was a liquid product which was low-viscous even at 5° C. and was completely free from isocyanate odor. Its amine equivalent was determined as 83.25 (theoretical value 81.1)

Reference Example 6

Production of 1,3,5-tris(isocyanatomethyl)cyclohexane

Phosgenation was carried out in the same manner as in Reference Example 5, except that 70.0 g of 1,3,5-tris(aminomethyl)cyclohexane (H$_6$MTA) was used in place of 1,3,5-tris(aminomethyl)benzene (MTA) and that the reaction mixture was heated from 10° C. to 120° C. over a 6-hour period and maintained at 120° C. for 6 hours, whereby there was obtained 91.8 g of 1,3,5-tris(isocyanatomethyl)cyclohexane (H$_6$MTI) (mole yield 90.1%). The H$_6$MTI was a liquid which was low-viscous even at 5° C. and odorless. Its amine equivalent was determined as 84.71 (theoretical value of 83.08).

EXAMPLE 1

A mixed solution consisting of 162.2 g of 1,3,5-tris(isocyanatomethyl)benzene (MTI), 300.0 g of polyoxypropylene glycol (molecular weight 600), 115.6 g of ethyl acetate and 0.09 g of dibutyltin dilaurate as catalyst was subjected to reaction at 70° C. for 4 hours (NCO/OH ratio 2.0). Thus, there was obtained an adhesive composition having a solid content of 80%, isocyanate-group content of 7.2% and viscosity of 430 cps (at 25° C.) (referred to as "Composition 1").

The adhesive composition was coated on the surface of a polyethylene terephthalate (PET) film (50μ in thickness) to 50μ in thickness. After preliminary drying (at 70° C., for 1 min.), the film was pressed to a surface of another PET film under pressure of 5 kg/cm$^2$ at 50° C. for 10 minutes to perform bonding. After the bonded film was left on standing at room temperature for 5 days, it was cut into pieces of 25 mm width and subjected to T peel test in accordance with the test method of ASTM D-1876-61 by use of a tensile loading tester at a peeling rate of 300 mm/min. Measurements on ten test pieces per one test sample averaged 2000 g/25 mm in peel strength.

By the same procedure, peel strength between an aluminum (Al) foil and cast polypropylene (cpp) (70μ in thickness; corona-treated surface) was 2200 g/25 mm.

EXAMPLE 2

A mixed solution consisting of 194.1 g of ω,ω'-diisocyanatodimethylbenzene (XDI), 208.1 g of polyoxypropylene glycol (molecular weight 1000), 117.6 g of dipropylene glycol, 225 g of ethyl acetate and 0.1 g of dibutyltin dilaurate as catalyst was subjected to reaction at 65° C. for 4 hours, and 5.2 g of trimethylolpropane was then added, followed by conducting the reaction for 2 hours. Thus, there was obtained a polyurethane polyol having a solid content of 70%, viscosity of 5000 cps and molecular weight of about 9,000.

An adhesive composition (referred to as "Composition 2") produced by adding 7 g of 1,3,5-tris(isocyanatomethyl)cyclohexane (H$_6$MTI) to 100 g of the polyurethane polyol (NCO/OH ratio 2.8) was immediately subjected to determination of peel strength by the same procedure as in Example 1.

For PET/PET: 2100 g/25 mm
For Al/cpp: 2250 g/25 mm

EXAMPLE 3

A mixed solution consisting of 162.2 g of MTI, 300 g of polyethylenebutylene adipate (ethylene glycol/1,4-butylene glycol=1/1 in molar ratio; molecular weight 600) (NCO/OH ratio 2.0), 154.1 g of ethyl acetate and 0.1 g of dibutyltin dilaurate was subjected to reaction at 65° C. for 5 hours. Thus, there was obtained an adhesive composition having a solid content of 75%, viscosity of 800 cps (at 25° C.) and isocyanate group content of 6.8% (referred to as "Composition 3").

For PET/PET: 2400 g/25 mm
For Al/cpp: 2700 g/25 mm

EXAMPLE 4

In 400 g of ethyl acetate was dissolved 600 g of a polyester glycol of 80000 in molecular weight obtained by reaction of a mixture of an isophthalic acid and adipic acid (1:1 in molar ratio) with a mixture of ethylene glycol and neopentyl glycol (1:1 in molar ratio), and 0.12 g of dibutyltin dilaurate was added to the solution, thus yielding a solution with a solid content of 60% and viscosity of 2500 cps.

An adhesive composition (referred to as "Composition 4") produced by adding 5 g of H$_6$MTI to 100 g of the resultant polyester polyol solution (NCO/OH ratio 4) was immediately subjected to determination of peel strength by the same procedure as in Example 1.

For PET/PET: 2500 g/25 mm
For Al/cpp: 3000 g/25 mm

EXAMPLE 5

A mixed solution consisting of 950 g of a polyester glycol (1,900 of molecular weight) obtained by reaction of a mixture of a dimethyl terephthalate and sebacic acid (1:1 in molar ratio) and a mixture of an ethylene glycol and 1,4-butylene glycol (1:1 in molar ratio), 87.1 g of tolylene diisocyanate (2,4-/2,6-=80/20), 703 g of a mixed solution of methyl ethyl ketone and toluene (1:1 in weight ratio) and 0.2 g of dibutyltin dilaurate as a catalyst was subjected to reaction at 60° C. for 4 hours, and 17.9 g of trimethylolpropane was added, followed by conducting the reaction for 2 hours. Thus, there was obtained a polyurethane polyol having a solid content of 60%, viscosity of 5,000 cps and molecular weight of 10,000.

The adhesive composition (referred to as "Composition 5") produced by adding 7 g of MTI to 100 g of the polyurethane polyol (NCO/OH ratio 3.8) was immediately subjected to determination of peel strength by the same procedure as in Example 1.
 For PET/PET: 3500 g/25 mm
 For Al/cpp: 3800 g/25 mm
 For PET/Al: 1800 g/25 mm

EXAMPLE 6

A mixed solution consisting of 250 g of a polyoxypropylene glycol (molecular weight 1000), 157 g of maleic anhydride and 0.5 g of N-ethylmorpholine was heated at 120° C., and propylene oxide (PO) was fed by a metering pump to conduct the reaction for 8 hours. The unreacted PO was distilled off and a polyether polyester glycol having 2,000 of molecular weight was obtained.

203 g of MTI, 401 g of ethyl acetate and 0.24 g of dibutyltin dilaurate were added to 1,000 g of the polyether polyester glycol, and the reaction was conducted at 65° C. for 5 hours (NCO/OH ratio 2.5). Thus, there was obtained an adhesive composition (referred to as "Composition 6") having a solid content of 75%, viscosity of 600 cps (at 25° C.) and isocyanate group content of 3.9%.

Peel strength was determined in the same procedure as in Example 1.
 For PET/PET: 2000 g/25 mm
 For Al/cpp: 2400 g/25 mm

EXAMPLE 7

A mixed solution consisting of 400 g of the polyether ester (molecular weight 2000), 29.1 g of ω,ω'-diisocyanatodimethylcyclohexane (H₆XDI), 184 g of ethyl acetate and 0.1 g of dibutyltin dilaurate was subjected to reaction at 65° C. for 7 hours, and there was obtained a polyurethane polyol having a solid content of 70%, viscosity of 500 cps and molecular weight of 8,580.

An adhesive composition (referred to as "Composition 7") produced by adding 7 g of H₆MTI to 100 g of the polyurethane polyol (NCO/OH ratio 5.1) was immediately subjected to determination of peel strength by the same procedure as in Example 1.
 For PET/PET: 2200 g/25 mm
 For Al/cpp: 2600 g/25 mm

EXAMPLE 8

A mixture composed of 191.1 g of H₆MTI, 30.6 g of diethylene glycol and 55.4 g of ethyl acetate was subjected to reaction at 70° C. for 5 hours. Thus, there was obtained H₆MTI-diethylene glycol adduct having a solid content of 80%, isocyanate group content of 26.1% and viscosity of 300 cps.

An adhesive composition (referred to as "Composition 8") produced by adding 5 g of the above adduct to 100 g of the polyester polyol solution obtained in Example 4 (molecular weight 8,000, 60% of solid content and 2500 cps of viscosity) (NCO/OH ratio 2.0) was immediately subjected to determination of peel strength by the same procedure as in Example 1.
 For PET/PET: 2600 g/25 mm
 For Al/cpp: 3500/25 mm

What is claimed is:

1. A composition for polyurethane adhesives which comprises (1) a triisocyanate of the formula:

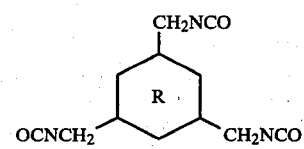

wherein

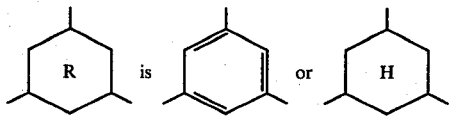

a modified product of said triisocyanate selected from the group consisting of a dimer of said triisocyanate, a trimer of said triisocyanate and a carbodiimide of said triisocyanate or an adduct of said triisocyanate having terminal isocyanate groups in a reaction product of said triisocyanate with an active hydrogen compound, and (2) an active hydrogen compound; wherein the proportions of (1) and (2) are such that the NCO/OH equivalent ratio is 0.4 to 20.

2. The composition of claim 1 wherein the NCO/OH equivalent ratio is 1.5 to 20.

3. A composition as claimed in claim 1, wherein the triisocyanate is 1,3,5-tris(isocyanatomethyl)benzene of the formula:

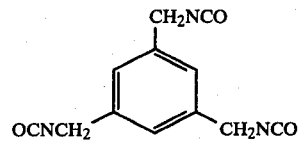

4. A composition as claimed in claim 1, wherein the triisocyanate is 1,3,5-tris(isocyanatomethyl)cyclohexane by the formula:

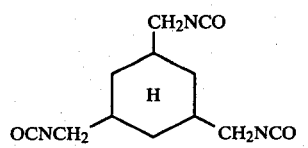

5. A composition as claimed in claim 1, wherein the active hydrogen compound is a polyol, polyamine, aminoalcohol or water.

6. A composition as claimed in claim 1, wherein the active hydrogen compound in one having at least two active hydrogens in its molecule and molecular weight of 62 to 50,000.

7. A composition as claimed in claim 1, wherein the active hydrogen compound is a polyhydroxyl compound having 2 to 10 hydroxyl groups per one molecule and molecular weight of 500 to 20,000.

8. A composition as claimed in claim 7, wherein the polyhydroxyl compound is a polyester polyol, polyether polyol, polyether ester polyol, polyester amide, acryl polyol or polyurethane polyol.

* * * * *